(12) United States Patent
Wang

(10) Patent No.: US 6,624,813 B1
(45) Date of Patent: Sep. 23, 2003

(54) THREE-DIMENSIONAL GRAPHICS PROCESSOR AND ITS DRAFTING METHOD USING PARALLEL SCANNING LINES AS PROCESSING UNIT

(75) Inventor: Tai-Cheng Wang, Hsin-Chu Hsien (TW)

(73) Assignee: Sunplus Technology Co., Ltd., Hsin-Chu Hsien (TW)

( * ) Notice: Subject to any disclaimer, the term of this patent is extended or adjusted under 35 U.S.C. 154(b) by 0 days.

(21) Appl. No.: 09/346,910

(22) Filed: Jul. 2, 1999

(30) Foreign Application Priority Data

Feb. 26, 1999 (TW) ........................... 88102916 A

(51) Int. Cl.[7] ............... G06T 11/20; G06T 15/20; G06T 15/00; G09G 5/00
(52) U.S. Cl. ............... 345/441; 619/427; 619/428; 619/522
(58) Field of Search ............... 345/580–582, 345/440, 441; G06T 17/40

(56) References Cited

U.S. PATENT DOCUMENTS

| | | | |
|---|---|---|---|
| 5,986,663 A | * 11/1999 | Wilde | 345/428 |
| 6,064,393 A | * 5/2000 | Lengyel et al. | 345/427 |
| 6,091,425 A | * 7/2000 | Law | 345/619 |
| 6,476,816 B1 | * 11/2002 | Deming et al. | 345/502 |
| 6,489,963 B2 | * 12/2002 | Parikh et al. | 345/522 |
| 6,538,658 B1 | * 3/2003 | Herrera | 345/582 |

* cited by examiner

*Primary Examiner*—Matthew C. Bella
*Assistant Examiner*—Anthony Blackman
(74) *Attorney, Agent, or Firm*—Rosenberg, Klein & Lee

(57) ABSTRACT

The present invention, a three-dimensional graphics processor and its drafting method using parallel scan-ning lines as processing unit, makes use of a data base memory to completely receive and store the triangle data at a time from the main memory. When it comes to displaying, it uses a horizontal scanning line or a plurality of scanning lines as processing unit to scan in order to search and calculate so as to process its corresponding triangle to make it become pixel. It further stores the pixel directly in the pixel buffer and display the pixel on the display device by accommodating the syncronized signal of the display device. In this way, it can replace the conventional way of using frame as processing unit and having to use a large space of frame buffer and Z-buffer. In addition, its data base memory can also store the 2D sprite, thereby, it not only can speed up the drafting speed of the 3D graphics, but also can achieve the object of integrating the multimedia apparatuses and simplifying the design.

15 Claims, 6 Drawing Sheets

THREE-DIMENSIONAL GRAPHICS PROCESSOR AND ITS DRAFTING METHOD USING PARALLEL SCANNING LINES AS PROCESSING UNIT

FIELD OF THE INVENTION

The present invention relates to a three-dimensional (3D) graphics processor and its drafting method using parallel scanning lines as processing unit. By the use of a horizontal scanning line or a plurality of horizontal scanning lines, it can omit the common frame and Z-registor. Moreover, it can share data base memory with 2D sprite which not only can speed up the 3D drafting but also can achieve the object of integrating the multimedia apparatuses as well as simplifying the design process.

BACKGROUND OF THE INVENTION

Following the advances in information industry, the common users of computer are no more in pursuit of the simple word processing or graphic display in 2D as in the early days, rather, they ask for the multimedia pictorial images in 3D simulating-the real situation to be shown in the computer display, that is, they are in pursuit of the target of picturesque presentation having relatively delicate and real stereoscopic sense. To meet the foregoing requirements, the 3D graphics technology plays the role as the medium between the computer and the real situation. The 3D graphics technology is not only applicable to the simulation of the real world in advance, it can also be employed to visualize in science, to have more esthetic sense in entertainment, as well as to be animated in product design. All of these applications show the shake up effect brought forth by the 3D graphics technology. Therefore, all the developed countries without exception take the 3D graphics technology as the star industry of the next century.

In general, the pictorial display of 3D graphics is achieved by the use of a 3D graphics processor. However, the way of processing of the 3D graphics processor of the prior art, as shown in FIG. 1, consists of two stages, i.e. the geometry engine stage and the rendering stage wherein the geometry engine stage mainly makes use of the CPU 11 to take the triangle data in the main memory 12 via a system bus 13 to perform calculation by using a frame as a processing unit, in other word, to transform the 3D stereoscopic spatial coordinate data into pixel data and to manage all the polygonal disposition including the specific attributes such as color, shadow, and stripe and so on. As there are a great amount of mathematical calculation which needs to be accom-plished by making use of the floating point unit of the CPU 11 in this stage, the data calculation and transmission of the CPU 11 are apt to be delayed. Consequently, the drafting speed of the stereo-scopic graphics will be affected.

The rendering stage mainly provides the stereoscopic and dynamic process which should be manifested when the actual pixels are shown in the 2D display device. Moreover, it receives the pixel data unloaded from the CPU 11, transforms the pixel data into the images which are to be shown eventually onto the display device 19 by means of the drafting chip set 20 constituted by a memory controller 22, a data buffer 24, a graphics controller 26, time sequence generator 28, and CRT-controller 29. It can also stores the images in a frame buffer 14 and a Z-buffer which can show the far-and-near distance of an object. It further shows the stereoscopic image onto the display device 19 in cooperation with the functions of a color palette controller 15, a color palette memory 155, vision encoder 17 and a synchronized signal generator 175 of the display device 175.

Since the 3D graphics processor uses a frame as an unit to process and calculate the 3D triangle elements, the processor increases their corresponding variables in advance, thereby, the accommodating memory space required by the frame buffer 14 and Z-buffer 16 shouldn't be too small. Take a pixel display device having 16 bit and 256×256 bits of resolution for example, the memory space of the frame buffer 14 should not be smaller than 256 k-byte while that of the Z-buffer 16 should not be smaller than 128 k-byte, otherwise it will cause trouble in image display. However, to the consumable style of electronic industry, such a big space of memory (SRAM) is too high in the proportion of cost expenditure, thereby, it is very hard to be popularized and used by the users.

What is more, the 3D graphics processors of the prior art are not able to share memories with the 2D sprite calculating device, thereby, it is hard to achieve the object of the sharing and integrating of resources. In this way, the designers, besides paying attention to the concept of software by transforming the great amount of calculation consumed by the software into hardware to reduce the amount of software calculation so as to speed up the processing work (the floating calculation process of CPU), they need also to think of the problems of the hardware coordination between the 3D and 2D graphics, thereby, there are design difficulties to some extent.

Therefore, it has been an ardent anticipation for the users and the present inventor to design a kind of three-dimensional graphics processor and its drafting method intending to effectively resolve the memory space problems of the frame buffer and the Z-buffer and further to speed up the graphics processing speed so as to achieve the object of sharing and integrating the resource of 2D and 3D graphics.

SUMMARY OF THE INVENTION

The main objective of the present invention is to provide a three-dimensional drafting method of graphics using parallel scanning lines instead of the conventional way of using frames as processing unit. It instantly calculates the pixels required to display the images and directly stores in the pixel buffer. It then accommodate the synchronized signal display of the display device to display their stereoscopic images, thereby, it not only can greatly save the amount of memory used in the frame buffer and Z-buffer, but also can reduce the cost expense.

The next objective of the present invention is to provide a three-dimensional drafting method of graphics using parallel scanning lines as processing unit wherein all the triangle elements are transfered to store in a data base memory without going through the calculation of the CPU, therefore, it will speed up the drafting speed of the 3D graphics without delay caused by the data calculation and transmission of the CPU.

The other objective of the present invention is to provide a three-dimensional drafting method of graphics using parallel scanning lines as processing unit wherein it makes use of the pipe-line operation method to calculate and process the work in the geometry engine stage and rendering stage of the triangle elements in order to bring its hardware function into full play so as to speed up the drafting of the graphics.

Another objective of the present invention is to provide a three-dimensional graphics processor using parallel scanning lines as processing unit wherein its data base memory can store sprites of 2D graphics and triangles of 3D graphics respectively in order to achieve the object of the integration of both and sharing resources.

One other objective of the present invention is to provide a three-dimensional graphics processor using parallel scanning lines as processing unit wherein the data base memory of the graphics processor can be built in a single chip together with the CPU in order to simplify the design and the manufacturing process.

Other objectives and advantages of the invention will be apparent from the following description, the accompanying drawings and the appended claims.

DETAILED DESCRIPTION OF THE INVENTION

Figure 1:
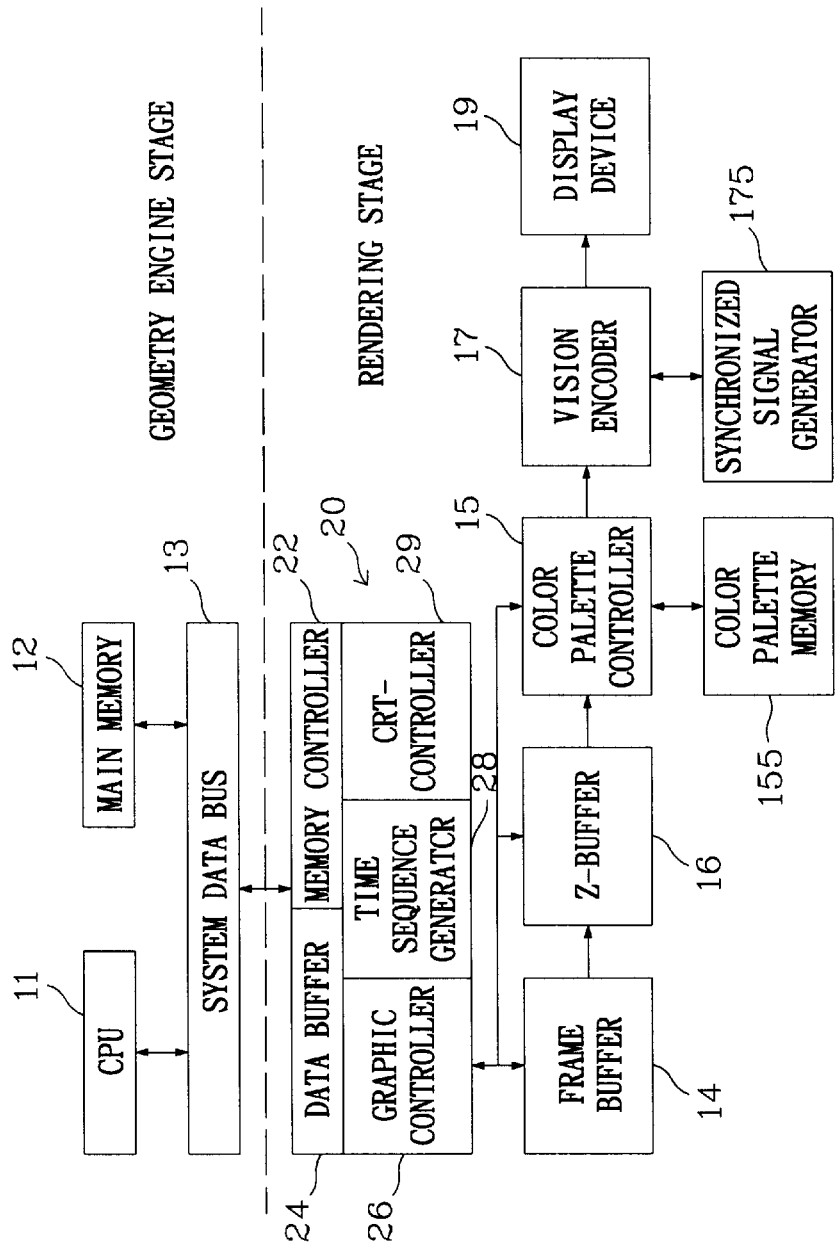
FIG. 1 is a schematic block diagram of the structure according to conventional 3D graphics processor.
Figure 2:
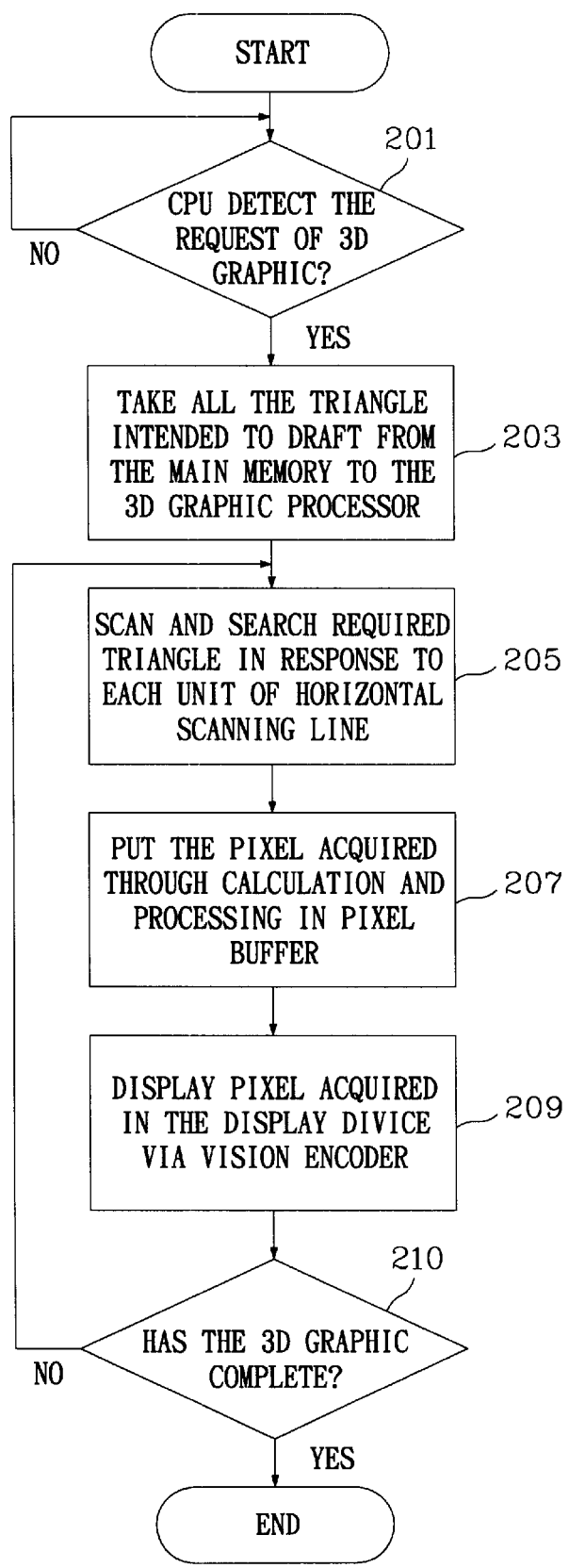
FIG. 2 is the drafting flow chart of the 3D graphics according to the present invention.

Referring initially to FIG. 2, the drafing flow chart of the 3D graphics of the present invention mainly comprises the following steps:

Step 201—The CPU detects if there is a request for the drafting of 3D graphics, if there is one, proceed to the next step, otherwise, it continues the detecting;

Step 203—To put the set of triangles, such as a frame or a plurality of horizontal scanning lines, intending to draft into the data base memory of the 3D graphics processor by the use of the pipe-line operation method;

Step 205—In response to each unit of horizontal scanning line, such as a horizontal scanning line or a plurality of horizontal scanning lines, to scan the triangles stored in the data base memory and find out their corres-ponding triangles;

Step 207—To transform the corresponding triangles into pixels through the calculation of the 3D graphics processor and to directly save those pixels in a pixel buffer;

Step 209—Accommodating the synchronized signals of a display device and a vision encoder to display the pixels on the display device; and Step 210—To judge if the drafting work of the 3D graphics is complete, if it is, the whole work is done, otherwise, go back to step 205 to proceed the next scanning work.

It is found in the foregoing steps that the CPU is not used as a device for performing the calculation for triangles, and the 3D graphics triangles are stored at a time in the graphics processor using a set of them as a unit, thereby, the data calculation and transmission of the CPU will not be delayed and will speed up the drafting work. It can also save the memory space since it calculates the processed pixels by the pipe-line operation method and directly stores them in the pixel buffer and Z-buffer in order to store the large amount of data by using frame as processing unit.

Figure 3:
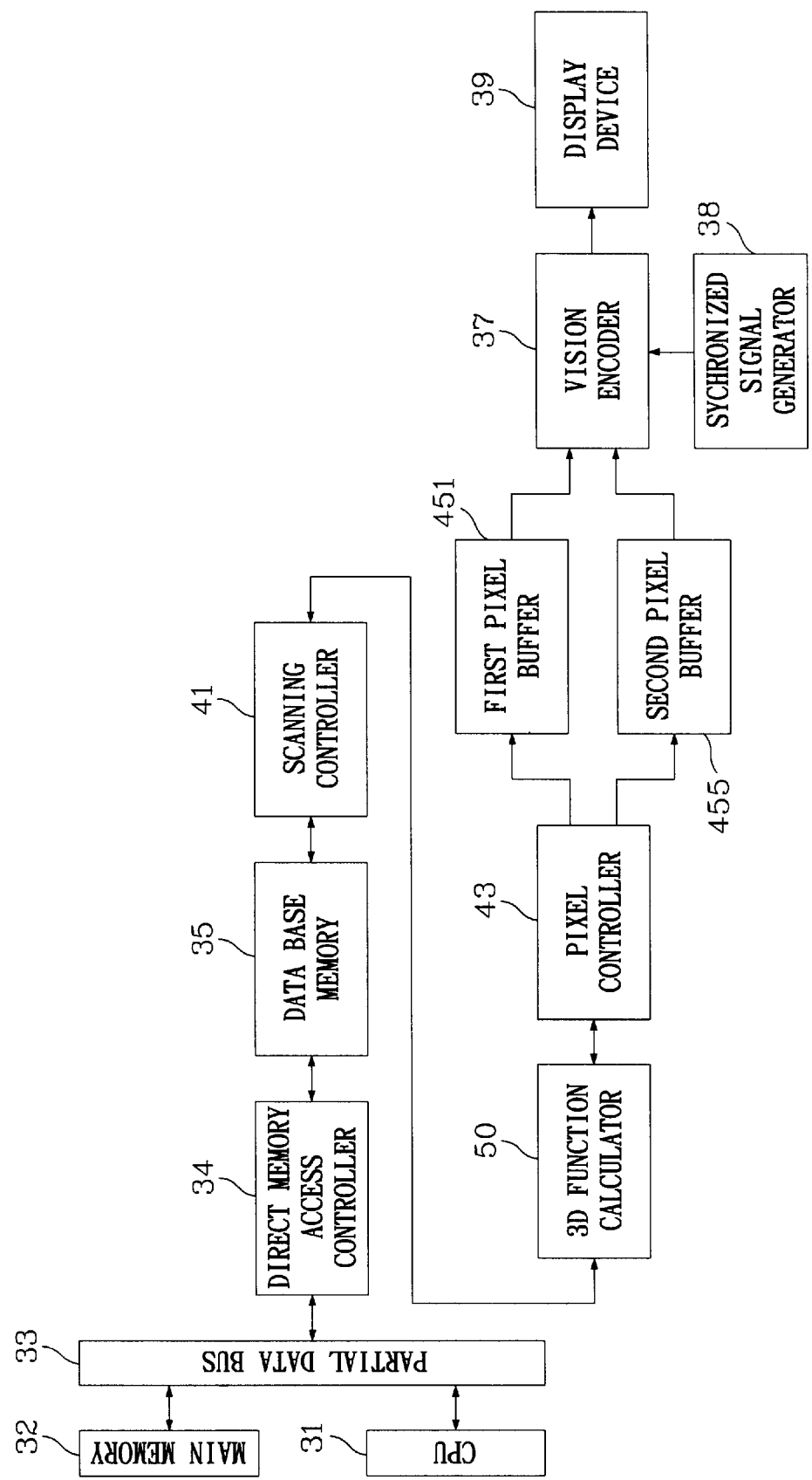
FIG. 3 is a schematic block diagram of the structure of a preferred embodiment of the present invention.

Additionally, the schematic diagram of the main structure of a present invention's preferred embodiment as shown in FIG. 3 shows that the 3D graphics processor mainly comprises a direct memory access controller 34, a data base memory 35, a scan controller 41, a 3D function calculator 50, a pixel controller 43, and pixel buffers 451, 455 wherein the direct memory access controller 34 is controlled by a CPU 31 through a partial data bus 33 in order to control the triangle data which the data base memory 35 receives them from a main memory 32 and they are all stored at a time in the data base memory 35. When the display device 39 intends to display its 3D scenes, the scanning controller 41 will go to scan the data base memory 35 in order to search and find out the triangle data drafted and showed the horizontal scanning line or a plurality of horizontal scanning lines so as to become pixel data through the calculation of the 3D function calculator 50. Moreover, being limited by the pixel controller 43, they choose to temporarily store in the first pixel buffer 451 or the second pixel buffer 455 wherein the first pixel buffer 451 stores pixels that the next horizontal scanning line intends to display while in the mean time, the second pixel buffer 455 being accommodating the function of the synchronized signal generator 38 of the display device 39 and the vision encoder 37 to display the 3D scenes in the horizontal scanning line or a plurality of horizontal scanning lines of the display device 39. And since the present invention uses a horizontal scanning line or a plurality of horizontal scanning lines as processing unit to calculate instead of the calculation style by employing the conventional way of using frame as processing unit, therefore, no large buffer data space is needed, all it needs is a data base memory and a pixel buffer 45 to replace large space of memory of frame buffer and Z-buffer to save cost expense.

Figure 4:
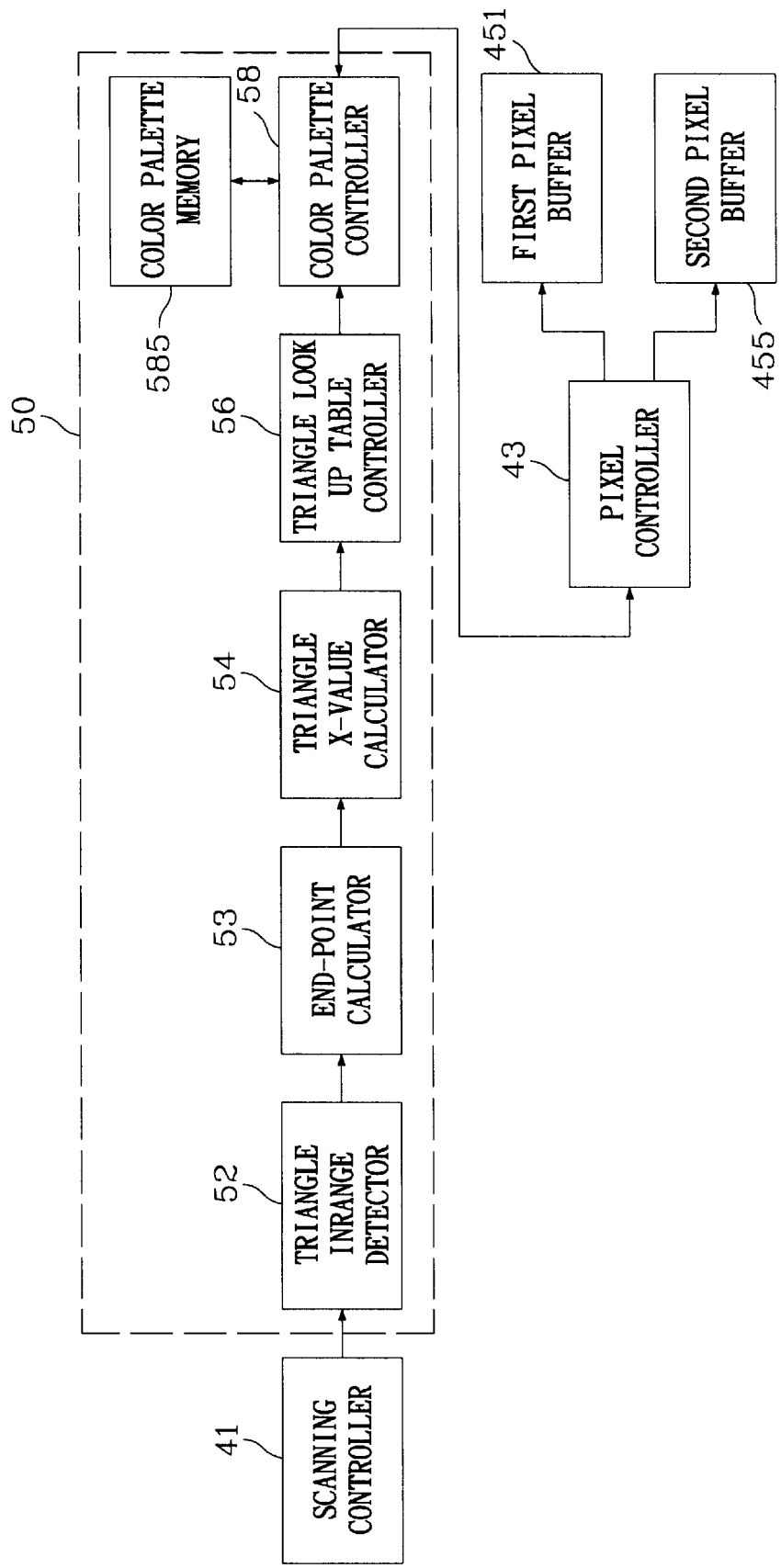
FIG. 4 is the inner structure of the 3D function calculator of the embodiment as shown in FIG. 3.

Referring to FIG. 4, the schematic diagram of the inner structure of the present invention's 3D function calculator 50 mainly comprises a triangle inrange checker 52, an end point calculator 53, a triangle X-value calculator 54, a triangle look up table controller 56, a color palette controller 58, and a color palette memory 585 wherein instead of the conventional method of calculating to process the geometry engine stage and the rendering stage of triangle, a pipe-line operation method is used without going through the CPU, thereby, it can bring its hardware function into full play to speed up the drafting of 3D graphics and to reduce retardation of CPU in processing data calculation and transmission.

Figure 5:
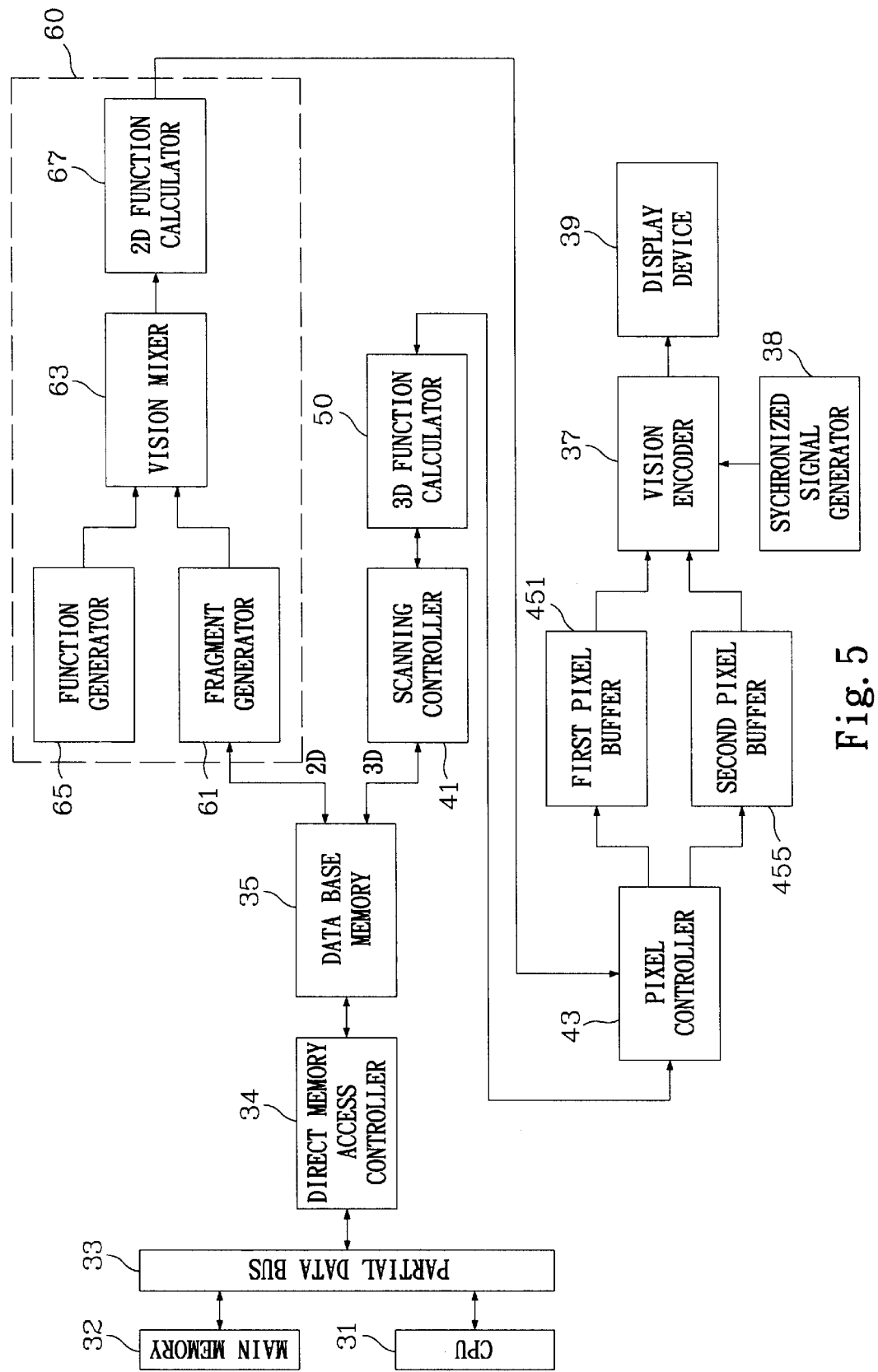
FIG. 5 is the schematic block diagram showing the main structure of another embodiment of the present invention.

Referring further to FIG. 5, it is the schematic diagram of another embodiment of the present invention. Since the sprite of 2D graphics or the framework of animation data are very much similar to that of the drafting of 3D graphics, therefore, the data base memory 35 of the present invention can also be connected to a 2D sprite calculation device 60 in order to store 2D sprite data wherein the 2D sprite calculation device comprises a fragment generator 61, a function generator 65, a vision mixer 63, and a 2D function calculator 67 wherein the fragment generator 61 can receive 2D attribute data originated from the data base memory 35 and transmit to the vision mixer 63 to be integrated through the action of the function generator 65 which can generate the functions of word and vision, as well as vision sequence data. By means of the calculation of the 2D function calculator 67, it obtain 2D graphics data, and is controlled by the pixel controller 43 in cooperation with the 3D graphics to display image on the display device 39 all together. Therefore, it can easily achieve the object of integrating the 2D and 3D graphics and simplifying its design since both of them pass through the same framework and data base memory. What is more, the data stored in the data base memory 35 can choose the appropriate transmission path by judging whether that batch of data is a 2D graphics or 3D graphics by the use of the variation of a attribute bit in the data.

Figure 6:
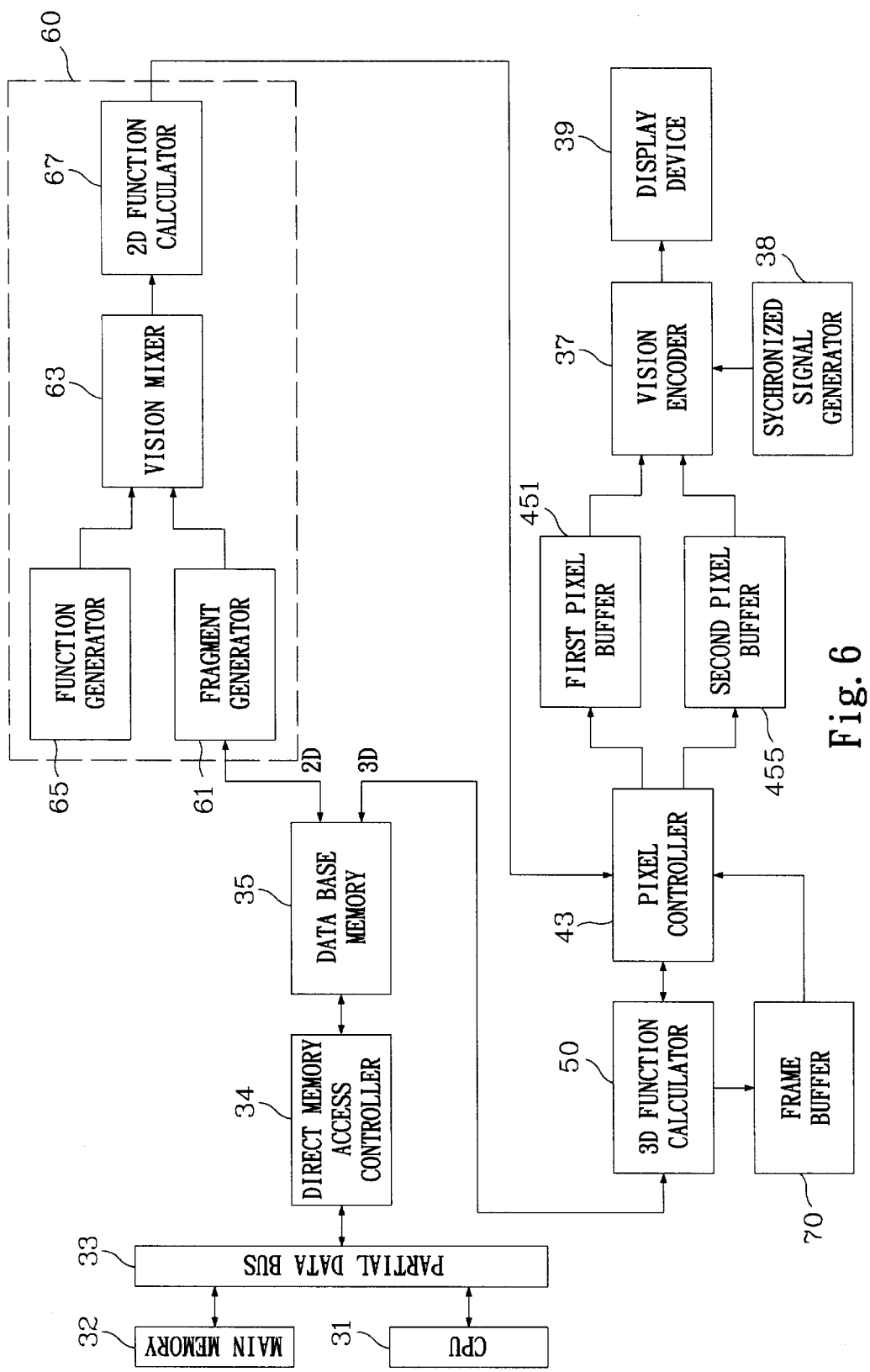
FIG. 6 is the schematic block diagram showing the main structure according to one other embodiment of the present invention.

Finally, since the space of the present invention's memory is a fixed type, the total number of triangles that the present invention's horizontal scanning lines can process is limited. In order to avoid the limitation on the use of the 3D graphics processor of the present invention in cooperation with the various resolution of the display device, one other embodiment of the present invention as shown in FIG. 6 is presented wherein a setup of a frame buffer 70 is connected to the 3D function calculator 50 and the pixel controller 43 respectively. When the 3D function calculator 50 receives data from the data base memory to accomplish the calculation by means of the pipe-line method or the whole frame method, the frame data will soon to store in the frame buffer 70 while the pixel controller 43 still uses horizontal scanning lines as processing unit to select to store in either the first pixel buffer 451 or the second pixel buffer 455 in accordance with the time sequence to control the data in the pixel buffer 70 in order to wait for the horizontal scanning lines in the display device to displace images. Owing to the assistance of the frame buffer 70, the graphics processor of the present invention can calculate to process the whole frame of data at a time with no limitation on the total number of triangles, and therefore does not need the scanning controller 41 as described in the foregoing embodiment. Besides, its calculating speed can still maintain at a certain extent since its internal calculation is still performed by the pipe-line operation style.

Certainly, the size of the memory space of the data base memory 35 and pixel buffer 45 can be adjusted at one's will depending on the resolution and actual needs of the display device 39, however, since the present invention uses each of the horizontal scanning line as its processing unit which is distinct from the conventional way of using frame as processing unit, the overall space used by the memory comparing with the summary of the conventional memory of frame buffer and the Z-buffer still can save a significant figure. Moreover, the 3D graphics processor can also be built in a single chip together with the CPU, thereby, it is relatively more flexible in the options to be chosen on the variety of memory and the size of its memory space.

To sum up, the present invention, which relates to a 3D graphics processor and its drafting method using parallel scanning lines as processing unit, uses a horizontal scanning line or a plurality of horizontal scanning lines as processing unit to omit the conventional way of using the frame buffer or Z-buffer in order to save the great amount of memory used and to share data base memory with 2D sprite, thereby, it not only speeds up the drafting speed but also achieve the object of integrating the multimedia apparatuses and simplifying its design.

Although the present invention has been illustrated and described previously with reference to the preferred embodiments thereof, it should be appreciated that it is in no way limited to the details of such embodiments, for instance, under the situation of strong function on the pixel controller, its first pixel buffer and second pixel buffer can be combined to become one unit, but is capable of numerous modification within the scope of the appended claims.

What is claimed is:

1. A 3D graphics processor using parallel scanning lines as processing unit with its main structure comprising:

a data base memory respectively connecting to a main memory and a CPU by means of a partial data bus for storing a plurality of triangle data from said main memory;

a direct memory access controller connected between said data base memory and said partial data bus;

a scanning controller connecting to said data base memory, in response to each unit of horizontal scanning lines to detect their corresponding triangles in said data base memory;

a 3D function calculator connecting and receiving the corresponding triangle data transmitted from said scanning controller to become displaceable pixels through calculation, said 3D function calculator including a triangle inrange checker, an end point calculator, a triangle X-value calculator, a triangle look up table controller, a color palette controller, and a color palette memory, said triangle inrange checker connected to said scanning controller, said color palette controller connected to said pixel controller;

a pixel controller connecting between said 3D function calculator and at least a pixel buffer to control said processed and calculated pixels and select directly from said 3D function calculator for storing one of said pixel buffer; and a vision encoder respectively connecting said pixel controller and a synchronized signal generator for transferring the pixels to digital/analog signals, and displaying a 3D graphics in a display device according to the time sequence in cooperation with the synchronized signals of the display device generated by said synchronized signal generator.

2. The 3D graphics processor according to claim 1 wherein said data base memory stores the sprite data of the 2D graphics, so that said data base memory is connected to a calculating device having 2D sprites.

3. The 3D graphics processor according to claim 2 wherein said 2D sprites calculating device comprises a segment generator, a vision mixer, a 2D function calculator, and a function generator, said segment generator connected to said data base memory, said 2D function calculator connected to said pixel controller, said vision mixer respectively connected to said segment generator, said 2D function calculator, and said function generator.

4. The 3D graphics processor according to claim 1 further comprising a frame buffer for storing the whole frame data, said frame buffer respectively connected to said 3D function calculator and said pixel controller.

5. The 3D graphics processor according to claim 1 wherein the preferred number of said pixel buffer is two.

6. The 3D graphics processor according to claim 1 wherein said 3D graphics processor is built in a single chip together with a CPU.

7. A method for rendering an image on a display device using a three-dimensional graphics processor coupled thereto, the image being logically divided into a plurality of triangles and stored in a main memory, the method comprising the steps of:

(a) transferring a plurality of triangles forming an image unit from the main memory to a data base memory on the three-dimensional graphics processor, each of said plurality of triangles having a corresponding image attribute associated therewith;

(b) partitioning said data base memory into a plurality of horizontal scan units, each of said horizontal scan units including a plurality of pixels;

(c) associating each pixel of one of said plurality of horizontal scan units to a corresponding one of said plurality of triangles forming said image unit;

(d) setting a pixel value for each of said plurality of pixels in said one of said horizontal scan units to said image attribute of said corresponding one of said plurality of triangles forming said image unit;

(e) storing said one of said horizontal scan units in a first pixel buffer after setting pixel values for each of said plurality of pixels;

(f) displaying a plurality of pixels stored in a second pixel buffer on the display device, said second pixel buffer having been previously filled in accordance with steps (a)–(e), wherein said first and second pixel buffers are adjustable in size corresponding to a pixel resolution of the display device; and (g) repeating the method at step (c), wherein said first pixel buffer functions as said second pixel buffer and said second pixel buffer functions as said first pixel buffer.

8. The method of rendering an image according to claim 7, wherein said image unit is an image frame.

9. The method of rendering an image according to claim 7, wherein said image unit is a plurality of horizontal scan lines.

10. The method of rendering an image according to claim 7, wherein each of said horizontal scan units is a single horizontal scan line.

11. The method of rendering an image according to claim 7, wherein each of said horizontal scan units is a plurality of horizontal scan lines.

12. The method of rendering an image according to claim 7, wherein said association step (c) and said pixel value setting step (d) are performed in a processing pipeline.

13. The method of rendering an image according to claim 7, wherein said data base memory is used to store sprites of a two-dimensional frame.

14. The method of rendering an image according to claim 13, wherein a determination of whether two-dimensional sprite data or three-dimensional triangle data is stored in said data base memory is accomplished by identifying a bit variation of data stored in said data base memory.

15. The method of rendering an image according to claim 13 further including the step of loading a frame buffer for receiving pixels of an entire image frame.

* * * * *